United States Patent [19]

Fujioka et al.

[11] Patent Number: 5,012,907
[45] Date of Patent: May 7, 1991

[54] TRANSMISSION FOR SEPARATELY DRIVABLE RIGHT AND LEFT WHEELS

[75] Inventors: Hisatake Fujioka; Tokio Horikawa; Nobuhide Yanagawa, all of Osaka, Japan

[73] Assignee: Kubota Corp., Osaka, Japan

[21] Appl. No.: 506,127

[22] Filed: Apr. 9, 1990

[30] Foreign Application Priority Data

Apr. 28, 1989 [JP] Japan .................. 1-109298

[51] Int. Cl.$^5$ .............................................. F16D 67/02
[52] U.S. Cl. ....................... 192/13 R; 192/93 C; 192/71; 192/18 R; 180/6.2
[58] Field of Search ............. 192/13 R, 18 R, 48.8, 192/71, 79, 93 C; 180/6.2, 6.7

[56] References Cited

U.S. PATENT DOCUMENTS

| 2,205,989 | 6/1940 | Meyers et al. | 192/18 R |
|---|---|---|---|
| 2,259,149 | 10/1941 | Cederstrom | 192/93 C |
| 2,376,799 | 5/1945 | Miller | 192/93 C |
| 2,407,060 | 9/1946 | Croft | 192/93 C |
| 2,498,399 | 2/1950 | Dodge | 192/71 |
| 2,787,355 | 4/1957 | Dodge | 192/18 R |

FOREIGN PATENT DOCUMENTS 52-53084 12/1977 Japan .
63-297174 12/1988 Japan .

Primary Examiner—Allan D. Herrmann
Assistant Examiner—Nicholas Whitelaw
Attorney, Agent, or Firm—Edwin E. Greigg; Ronald E. Greigg

[57] ABSTRACT

A transmission comprises transmission shafts connected to right and left wheels, respectively. Each transmission shaft has a side clutch and a side brake. The side clutch includes clutch balls movable radially of the transmission shaft between a clutching position engaged with a first engagement portion of the transmission shaft and a declutching position radially retracted from the transmission shaft. The side brake includes brake balls movable radially of the transmission shaft between a braking position engaged with a second engagement portion of the transmission shaft and a releasing position radially retracted from the transmission shaft. A shifter sleeve is axially movably mounted on each transmission shafts. The shifter sleeve includes a first space for accommodating the clutch balls, a second space for accommodating the brake balls, and a projection for pressing the clutch balls and brake balls. The sleeve is movable between a position in which the projection presses the clutch balls into the first engagement portion, and a position in which the projection presses the brake balls into the second engagement portion with the clutch balls accommodated in the first space.

8 Claims, 3 Drawing Sheets

TRANSMISSION FOR SEPARATELY DRIVABLE RIGHT AND LEFT WHEELS

TECHNICAL FIELD

The present invention relates to a steering device for a walking operator type agricultural machine having ball type side clutches for making and breaking power transmission to right and left transmission shafts that separately drive right and left running wheels.

BACKGROUND OF THE INVENTION

Agricultural machines of the type controlled by a walking operator, such as tillers and binders, are steered by selectively disengaging ball type side clutches provided for right and left axles, respectively, as shown in Japanese Patent Publication Kokai No. 63-297174.

When turning the machine according to the prior art, the axle inwardly with respect to the turning circle is in a declutched freely rotatable state and tends to rotate under the influence of the outward, driven wheel. Particularly when the machine makes a small, sharp turn, it is necessary for the operator to firmly hold the handle associated with the inward wheel against a forwardly pulling force.

Such instances are notable particularly where the machine has a crawler drive.

SUMMARY OF THE INVENTION

An object of the present invention is to realize a reduced turning radius by forcibly stopping the running device inwardly with respect to the turning circle when the vehicle makes a small, sharp turn by driving only the other running device.

The above object is achieved by a transmission for separately drivable right and left wheels comprising a pair of right and left transmission shafts connected to the wheels, respectively; ball type side clutches each having clutch balls movable radially of the transmission shaft to transmit power to the transmission shaft, the clutch balls being movable between a clutching position engaged with a first engagement portion of the transmission shaft and a declutching position radially retracted from the transmission shaft; ball type side brakes each having brake balls movable radially of the transmission shaft to brake the transmission shaft, the brake balls being movable between a braking position engaged with a second engagement portion of the transmission shaft and a releasing position radially retracted from the transmission shaft; and shifter sleeves axially movable mounted on the transmission shafts, respectively, each of the shifter sleeves including a first space for accommodating the clutch balls, a second space for accommodating the brake balls, and pressing means for pressing the clutch balls and the brake balls, and movable between a first position in which the pressing means presses the clutch balls into the first engagement portion, and a second position in which the pressing means presses the brake balls into the second engagement portion with the clutch balls accommodated in the first space.

According to the above construction, when in order to make a small, sharp turn the side clutch associated with the inward running device with respect to the turning circle is disengaged by shifting the corresponding shifter sleeve, the corresponding transmission shaft engages a fixed body, e.g. a transmission case, through the brake balls to place the side brake in an operable state. As a result, the inward running device stops and the agricultural machine turns with a radius around the inward running device.

When the shifter sleeve is shifted to engage the side brake, the transmission shaft is released from the engagement with the transmission case through the brake balls. This places the side brake in an inoperable state to allow the running device to be driven.

Thus, when one side clutch is disengaged for the machine to make a small, sharp turn, the inward running device is stopped by the side brake. This allows the machine to turn with a reduced turning radius.

Since the side brake is operated by shifting the shift sleeve farther than the position for operating the side clutch, an operation for applying the side brake is carried out continuously with a clutch control operation. Thus, a small turning radius is achieved while simplifying the operation.

The ball type side brake has excellent operability compared with the claw type, since balls are easier to engage and disengage. Although easier to disengage, there is no problem in the stability for maintaining an engaged state. The ball type side brakes according to the present invention have a simple construction, are manufactured at low cost since the side brakes are integrated with the ball type side clutches.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

A walking operator type agricultural machine that runs on crawlers will be described hereinafter as an example of machines embodying the present invention, with reference to the drawings.

Figure 1:
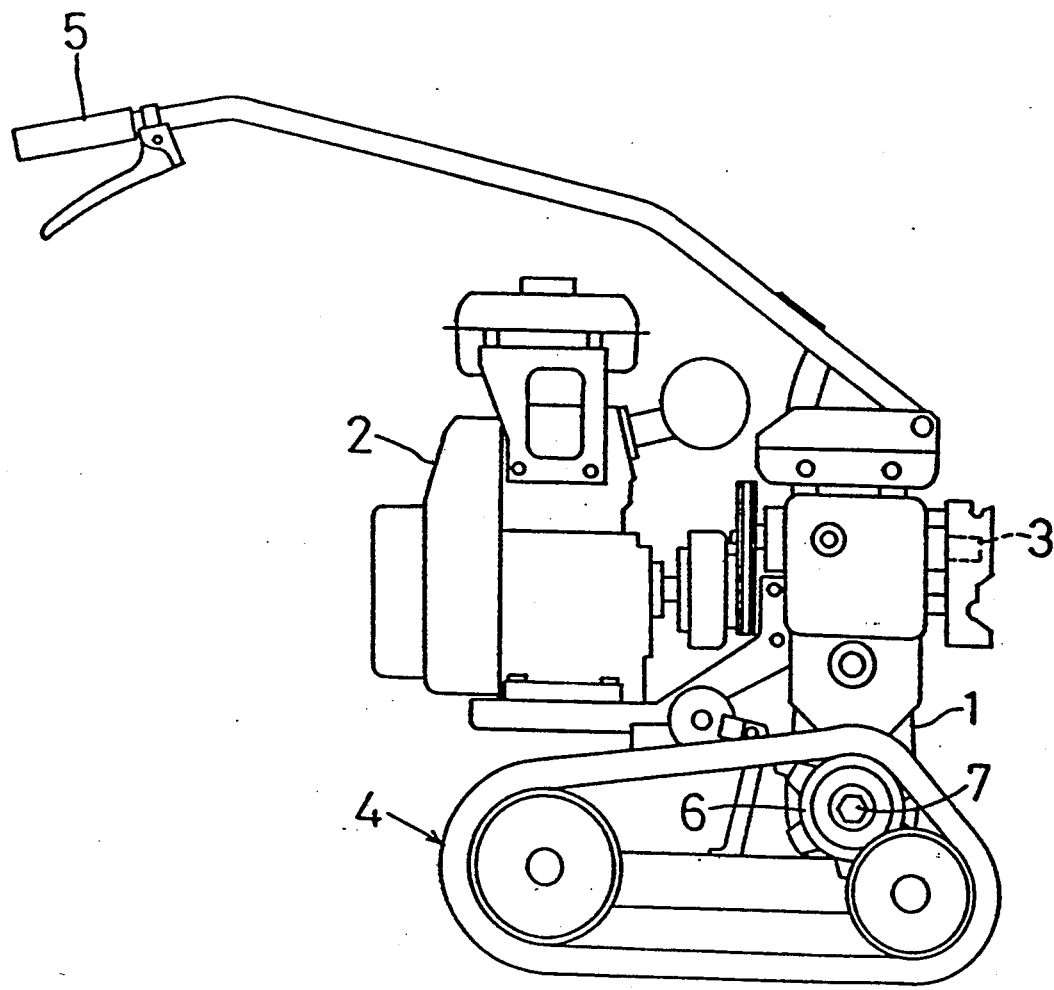
FIG. 1 is a side elevation of a walking operator type agricultural machine having a transmission according to the present invention.

As shown in FIG. 1, the walking operator type agricultural machine comprises a transmission case 1, an engine 2 disposed rearwardly of the transmission case 1, and a PTO shaft 3 disposed forwardly of the transmission case 1 for driving a working implement not shown. The machine further comprises right and left crawler running devices 4 below the transmission case 1, and a steering handle 5 above the transmission case 1.

The transmission case 1 supports axles 7 for driving drive wheels 6 of the right and left crawler running devices 4, respectively, and contains ball type side clutches 8 for making and breaking power transmission to the axles 7. This construction will be described in detail next.

Figure 2:
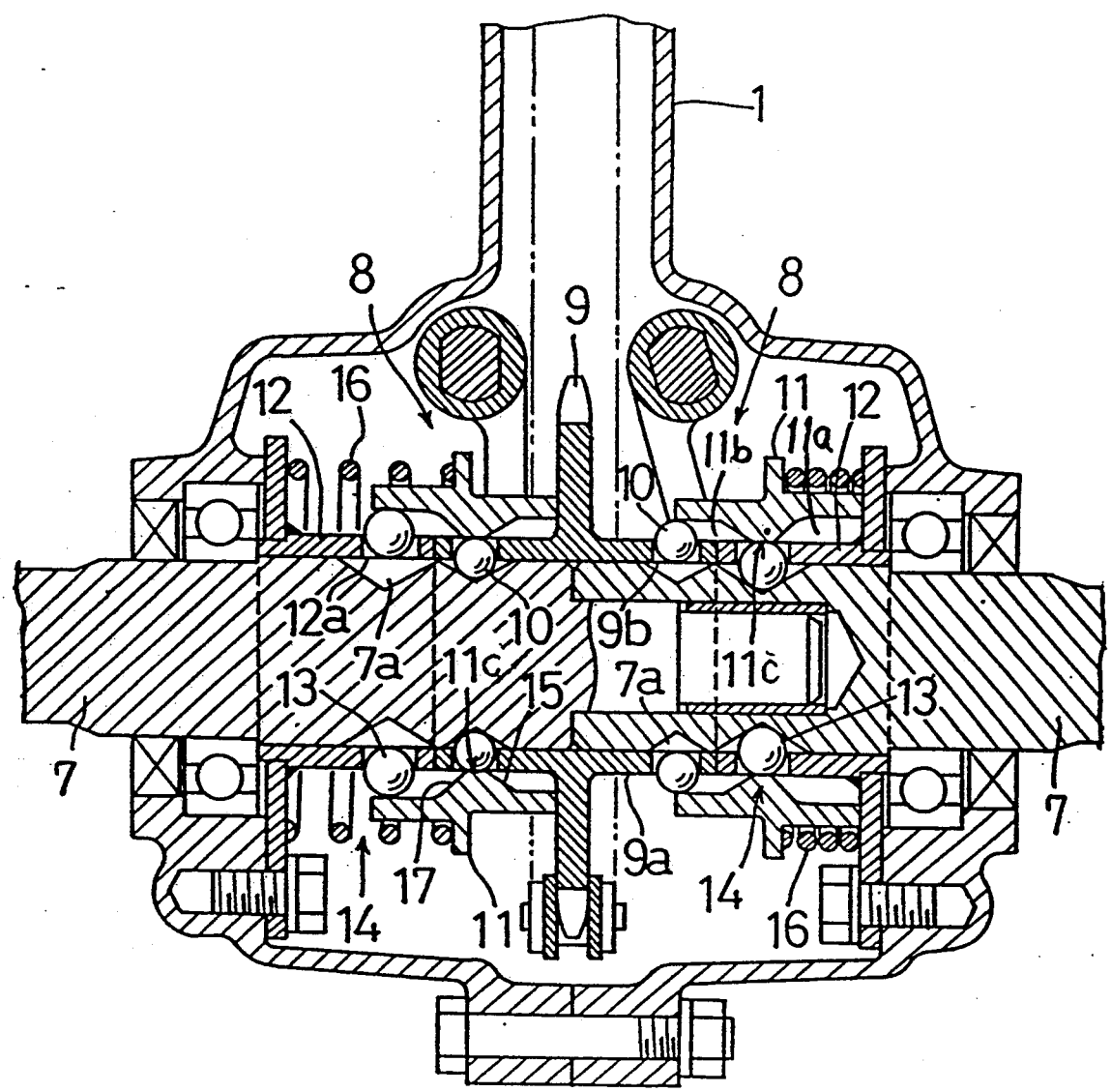
FIG. 2 is a sectional view of the transmission according to the present invention.

As shown in FIG. 2, a gear 9 is relatively rotatably mounted in a bridging way on the right and left axles 7 having abutting end faces. Each side clutch 8 includes inward bores 9b defined in a tubular portion 9a of the gear 9, recesses 7a defined in the axle 7, clutch balls 10 engageable with the inward bores 9b and recesses 7a, and a shifter sleeve 11 slidable axially of the axle 7.

The slidable shifter sleeve 11 has two functions, to permit and prevent radial displacement of the clutch balls 10 and to apply and release a side brake by connecting and disconnecting the axle 7 to/from the transmission case 1. The shifter sleeve 11 essentially is a tubular body defining a radially inward projection 11c on an intermediate inside wall position thereof. The projection 11c has inclined surfaces 15 and 17 on opposite sides thereof. On both sides of the projection 11c are a first space 11b for accommodating the clutch balls and a second space 11a for accommodating brake balls to be described later. The projection 11c acts to press the clutch balls and brake balls.

Ball type side brakes will be described next. Each axle 7 is fitted with a flanged tubular member 12 bolted to an inside wall of the transmission case 1. The tubular member 12 defines outward bores 12a extending radially thereof. Brake balls 13 are accommodated in the outward bores 12a and recesses 7a arranged peripherally and opposed to the outward bores 12a. Shifting of the shifter sleeve 11 allows the brake balls 13 to become displaced radially into the second space 11a, and prohibit such displacement by means of the projection 11c.

According to this side brake, the brake balls 13 are engageable with both the outward bores 12a and recesses 7a when the shifter sleeve 11 is shifted beyond a declutching position. When the shifter sleeve 11 is in a clutching position with the projection 11c pressing the clutch balls 13, the brake balls 13 are allowed to move radially out of engagement with the recesses 7a.

The inclined surfaces 15 and 17 formed on the sleeve 11 across the projection 11c have different angles of inclination to enable smooth shifting. The shifter sleeve 11 is constantly urged toward the clutching position by a return spring 16.

The way in which the above mechanism operates will be described next. When the shifter sleeve 11 is shifted outwardly of the machine body, the projection 11c releases the clutch balls 10 to establish a declutching state, thereby breaking the power transmission to the axle 7. By further shifting the shifter sleeve 11 in the same direction, the brake balls 13 are caused to engage the axle 7 and tubular member 12 to apply the side break, thereby locking the axle against rotation.

A small, sharp turn may be made as in the prior art by stopping the shifter sleeve 11 short of the position for operating the side brake 14.

When the shifter sleeve 11 is shifted inwardly of the machine body, the side brake 14 is first released, and by further shifting the sleeve 11 in the same direction the side clutch 8 is engaged.

Figure 3:
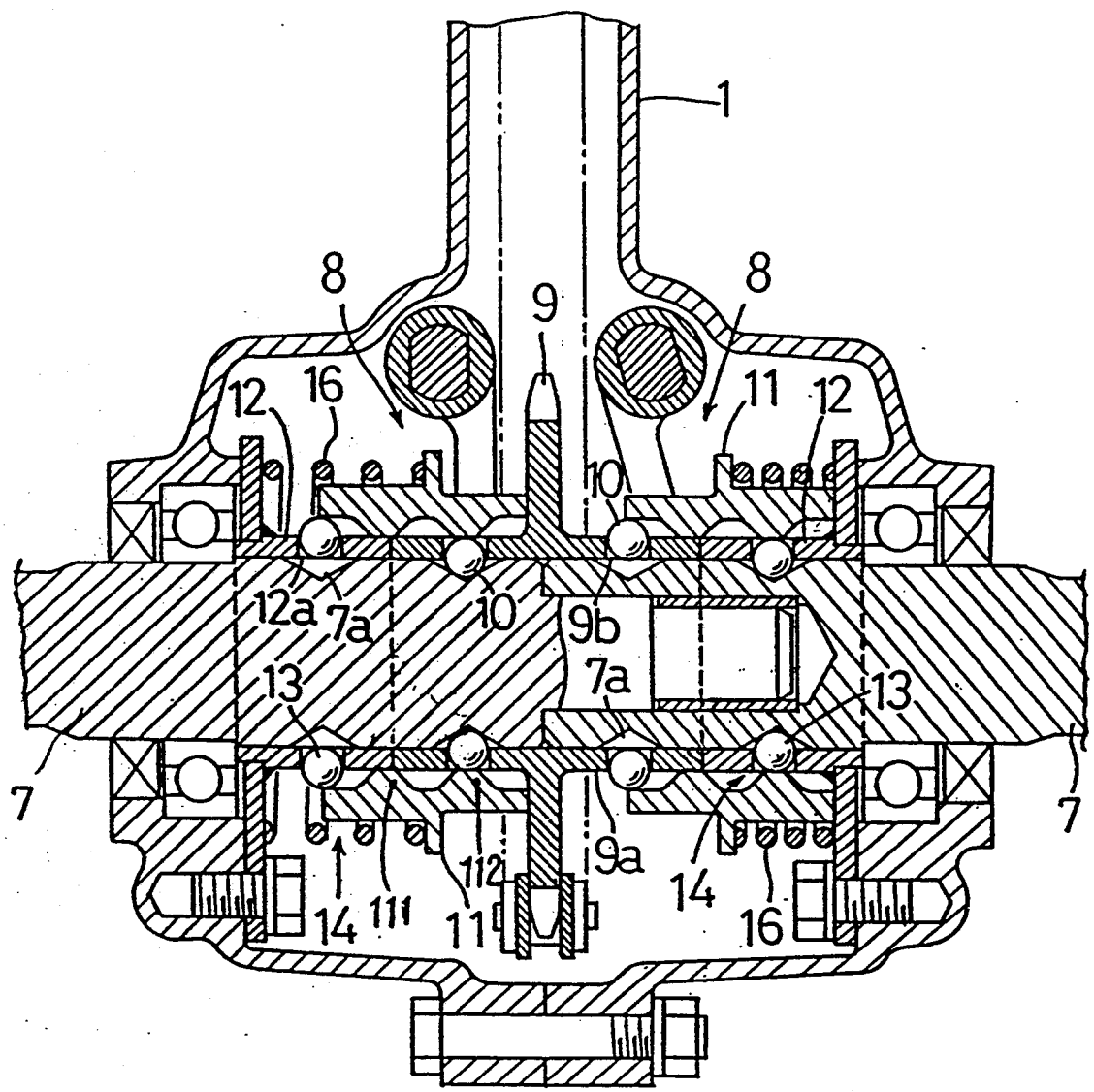
FIG. 3 is a sectional view of a modified transmission.

Referring to FIG. 3, each shifter sleeve 11 may define separate projections 111 and 112 for pressing the clutch balls 10 and brake ball 13.

The embodiment shown in FIG. 2 has the advantage of a compact control device, whereas the embodiment shown in FIG. 3 has the advantage of allowing an increased freedom of design.

The present invention may be applied to an agricultural machine having side clutches 8 provided for intermediate shafts that transmit reduced drive to axles 7. In this sense, the axles 7 and intermediate shafts are called herein transmission shafts 7 for driving the running wheels.

Further, the invention may be applied to a riding type agricultural machine.

What is claimed is:

1. A transmission for separately drivable right and left wheels comprising:
    right and left transmission shafts connected to said right and left wheels, respectively,
    ball type side clutches each having clutch balls movable radially of each of said right and left transmission shafts to transmit power to each of said right and left transmission shafts, said clutch balls being movable between a clutching position engaged with a first engagement portion of a respective transmission shaft and a declutching position radially retracted from said respective transmission shaft,
    ball type side brakes each having brake balls movable radially of each of said right and left transmission shafts to brake the respective transmission shaft, said brake balls being movable between a braking position engaged with a second engagement portion of each of said right and left transmission shafts and a releasing position radially retracted from said respective transmission shaft, and
    shifter sleeves axially movably mounted on each of the right and left transmission shafts, respectively, each of said shifter sleeves including a first space for accommodating said clutch balls, a second space for accommodating said brake balls, and pressing means for pressing said clutch balls and said brake balls, and movable between a first position in which said pressing means presses said clutch balls into said first engagement portion, and a second position in which said pressing means presses said brake balls into said second engagement portion with said clutch balls accommodated in said first space.

2. A transmission as claimed in claim 1, wherein each of said shifter sleeves, in an intermediate position between said first position and said second position, allows said clutch balls retracted into said first space with said brake balls accommodated in said second space.

3. A transmission as claimed in claim 2, wherein said first space and said second space comprise recesses defined in inside peripheral walls of said shifter sleeve, and said pressing means comprises a projection extending radially inwardly between said first space and said second space.

4. A transmission as claimed in claim 1, wherein each of said ball type side brakes includes a fixed sleeve disposed between said transmission shaft and said shifter sleeve and defining radial bores, said brake balls being prevented from moving peripherally and allowed to retract into said second space by said bores.

5. A transmission as claimed in claim 1, further comprising a sprocket wheel relatively rotatably mounted on each of said right and left transmission shafts to act as a power transmitting means at an input side of said side clutches, said sprocket wheel including bosses each defining radial bores, said clutch balls being prevented from moving peripherally and allowed to retract into said first space by said bores.

6. A transmission as claimed in claim 5, wherein the right and left transmission shafts are relatively rotatably abutted and connected by a geometric engagement, said bosses of the sprocket wheels being located over a connecting region of said transmission shafts.

7. A transmission as claimed in claim 3, wherein each of said shifter sleeves is urged toward said first position by urging means.

8. A transmission as claimed in claim 2, wherein said first space and said second space comprise recesses defined in inside walls of said shifter sleeve, and said pressing means comprises two projections arranged between said first space and said second space and extending radially inwardly, one of said projection being capable of pressing said clutch balls and the other being capable of pressing said brake balls.

* * * * *